L. D. MORTON.
PACKAGE SEALING MACHINE.
APPLICATION FILED AUG. 5, 1916.
Reissued Mar. 6, 1917.
14,267.
2 SHEETS—SHEET 1.
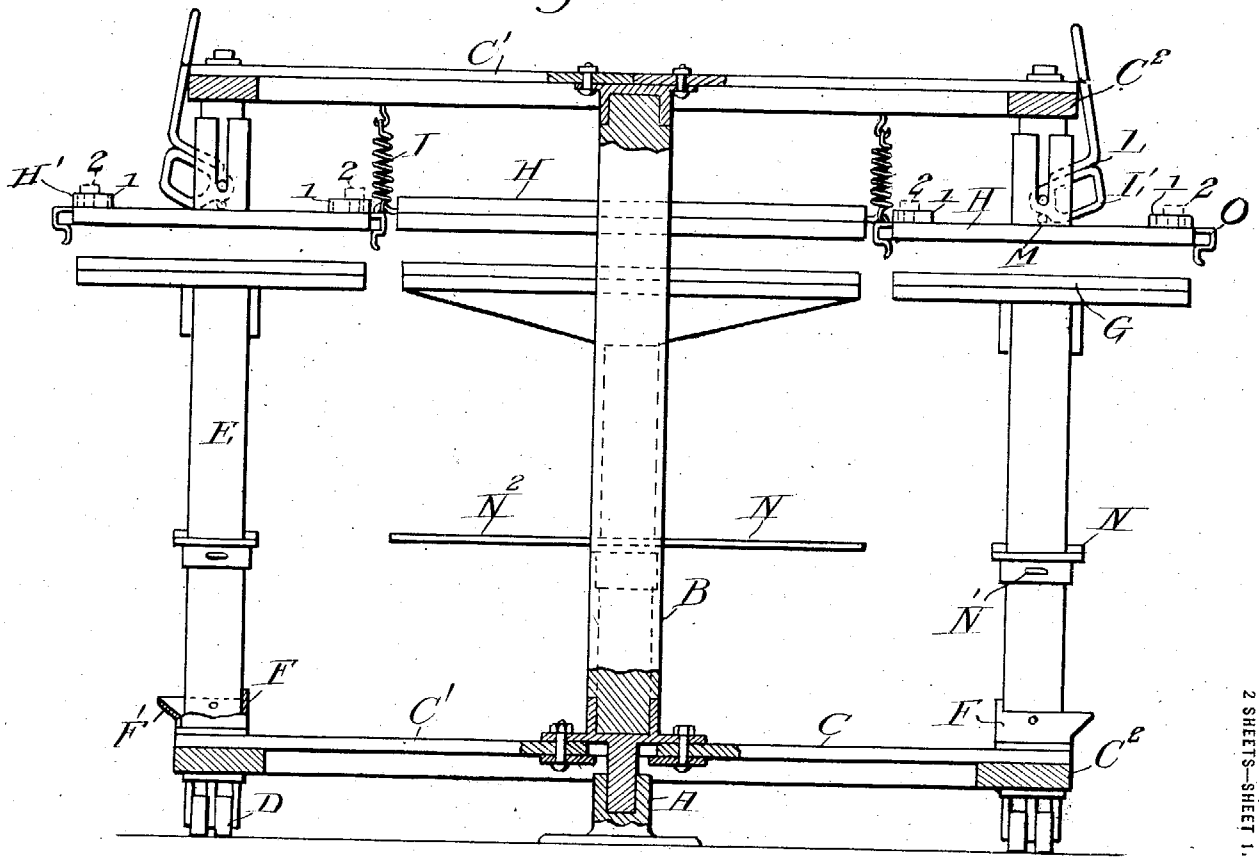
Inventor
Lawrence D. Morton
by Max W. Zabel Atty.

L. D. MORTON.
PACKAGE SEALING MACHINE.
APPLICATION FILED AUG. 5, 1916.
Reissued Mar. 6, 1917.
14,267.
2 SHEETS—SHEET 2.
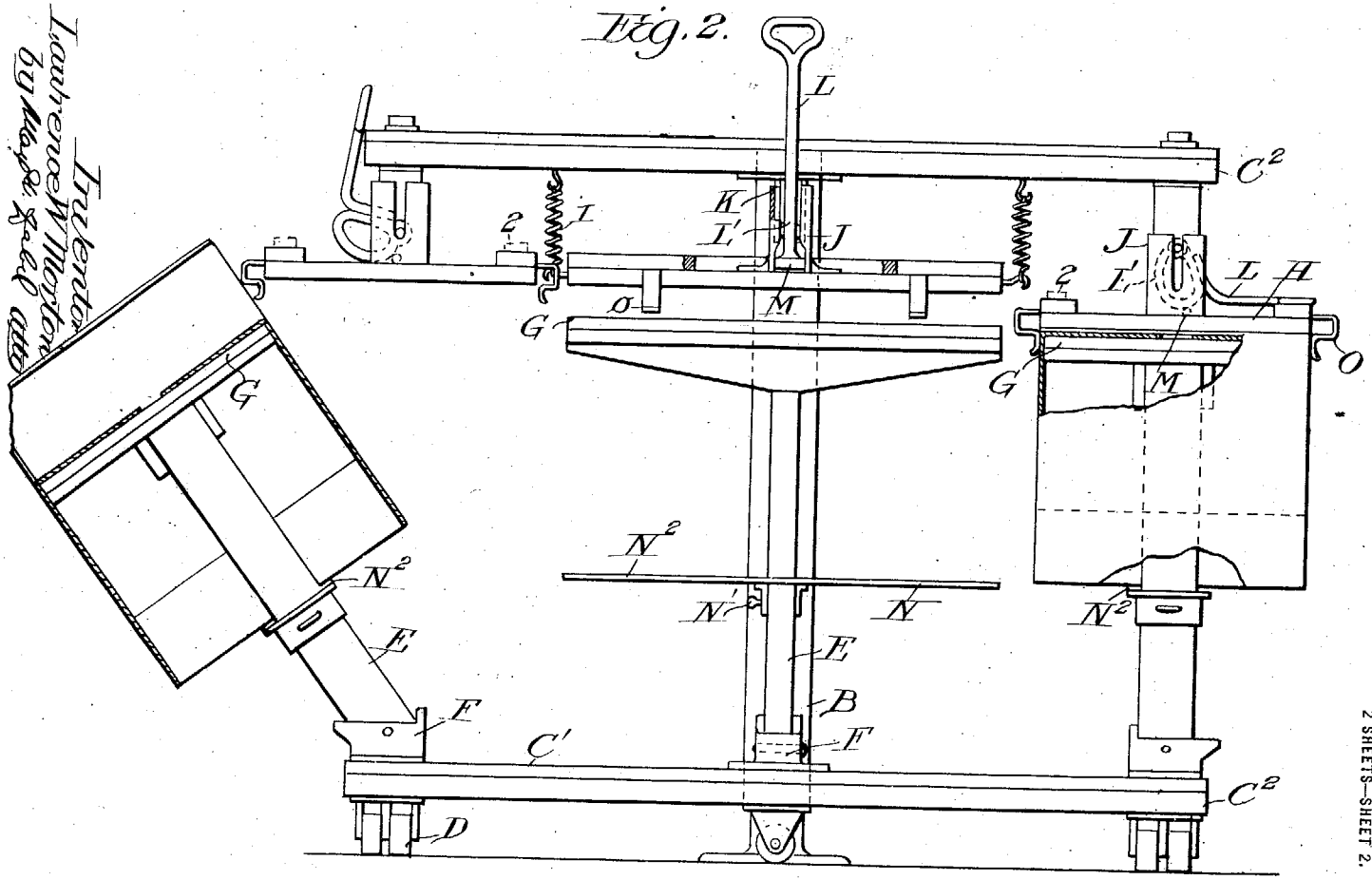

UNITED STATES PATENT OFFICE.

LAWRENCE D. MORTON, OF SANDUSKY, OHIO, ASSIGNOR TO THE HINDE & DAUCH PAPER COMPANY, OF SANDUSKY, OHIO, A CORPORATION OF OHIO.

PACKAGE-SEALING MACHINE.

14,267. Specification of Reissued Letters Patent. Reissued Mar. 6, 1917.

Original No. 1,138,238, dated May 4, 1915, Serial No. 800,155, filed November 10, 1913. Application for reissue filed August 5, 1916. Serial No. 113,415.

*To all whom it may concern:*

Be it known that I, LAWRENCE D. MORTON, a citizen of the United States of America, residing at Sandusky, in the county of Erie and State of Ohio, have invented certain new and useful Improvements in Package-Sealing Machines, of which the following is a specification, reference being had therein to the accompanying drawings.

It is the object of the invention to obtain a construction of machine adapted to facilitate the operation of closing and sealing the overlapping flaps of a paper board carton or package, and the invention comprises various features of construction as hereinafter set forth. My improved machine is particularly designed for use in connection with the heavier grades of knock-down boxes made of heavy card board, corrugated paper or the like. These knock-down boxes are usually folded with the sides glued, but with the unfolded ends projecting, the whole being folded flat, thus to consume the least amount of space when shipping. When these flat box forms reach their destination which is usually the shipping room of the concern where they are to be used, unskilled labor is utilized to first seal one end of the box. Thereafter the boxes are filled with merchandise and the sealing of the second end presents no particular difficulties. My machine is utilized to seal the first end of the knock-down box form, and this is done by the usual unskilled labor found in the shipping room. One of the objects of my invention is to prevent accidents to the operator during this operation as in many of the heavier grades of box forms used it is necessary for the operator to manually manipulate the box form while certain instrumentalities of the machine are being brought to their sealing condition. In some forms of boxes it is necessary to have the end flaps of the box actually abut in order to have a closed end.

Primarily a platen must be provided which permits of folding these box forms of relatively thick and strong material, and which in most instances supports the lower unfolded extremities of the box form, to thereby make accurate folding possible.

In one form of the device as herein set forth, I show a bank or plurality of individual sealing mechanisms, there being a sufficient plurality so that the operator may continuously operate the units one after another. The time which elapses during which the operator charges all of the mechanisms being about equal to the time required for the glue or adhesive to set.

In the particular form herein shown I have illustrated this plurality of sealing devices as mounted upon a revoluble carriage, although it will of course be readily apparent that such a mounting of my improved devices is not essential to the operation, and that modifications of this structure may be readily made within the scope of the appended claims.

In the drawings: Figure 1 is a vertical central section through the machine; and Fig. 2 is a side view illustrating the operation.

The package or carton which is closed and sealed upon my improved machine comprises rectangular sides hinged to each other at the corners and projecting flaps from opposite ends thereof. In knock-down position the sides and end flaps lie in the same plane, but in setting up the box the sides must first be adjusted to rectangular position and the end flaps then turned down to form the bottom. Furthermore, these end flaps which overlap each other must be permanently secured by some adhesive while hardening. With my invention provision is made, first, for holding the sides of the box in rectangular position while the end flaps are being pasted; and second, for clamping and holding the pasted flaps until the adhesive sets.

In detail, A is a central pivot plate secured to the floor and forming a pivot bearing for a post B.

C is a frame secured to the post B and comprising radial arms C′ at the top and bottom of said post and annular frames $C^2$ attached to said arms. The lower frame $C^2$ is additionally supported by caster wheels D which permit of rotating the frame with slight vertical resistance.

E are posts or standards secured to the sides of the bottom frame $C^2$ and having a hinge connection therewith, permitting of movement into an oblique or angular position. This is preferably formed by a socket casting or fitting F mounted upon the frame $C^2$, one side of which F′ is inclined, as shown.

G are forms adapted to fit within the package to be sealed and which are detachably supported upon the posts E.

H are heads supported upon the upper frame $C^2$ in a position to be in alinement with the heads G when the posts E are in upright position. The heads H are vertically adjustable, being secured to the frame $C^2$ by springs I and being centrally guided by brackets J telescopically engaging complementary guides K upon the upper frame $C^2$. The guides K are bifurcated, and between the furcations thereof is pivotally secured a lever L having a cam portion L′ adapted to bear upon a roller M in the bracket J. The arrangement is such that a rocking of the lever L will cause the cam L′ to depress the head H against the tension of the springs I and to move it into clamping contact with the head G.

To support the box to be sealed during the operation of turning down the flaps an adjustable rest N is secured to each standard E. This preferably comprises a sleeve upon said standard secured by a set screw N′, and having arms $N^{2\prime}$ extending from opposite sides thereof.

On the top of the head H there is a member H′ which carries the guides for registering the package with the head. This member H′ is adjustably secured to the head H by virtue of a bolt and slot connection, the slot, 1, being in the member H′ and the bolt 2, passing through the slot, is securely fastened in the head H. The head of the bolt when the same is in its secured position prevents the separation of the parts.

In operation, a pile of the knock-down packages is placed adjacent to one side of the machine, and the operator taking his position in proximity to this pile successively sets up and seals the packages as follows: The standard E is first turned down in inclined position, as shown at the left of Fig. 2. One of the knock-down boxes or packages is then taken from the pile and, after opening out the sides, is slipped over the head G, the lower flaps bearing against the rest $N^2$. This will bring the hinge line between the upper flaps and the sides into the plane of the upper face of the head G, permitting the operator to turn down the flaps against this head. As has been stated, the flaps upon adjacent sides overlap each other, and to permanently secure these together a suitable paste or glue is applied to the outer face of the flap first turned down, and the overlapping flaps are then folded into contact therewith. After this operation the standard E is moved into upright position, and the head H is clamped against by drawing down the lever L. During this operation the guides O insure proper registration of the heads G and H, so that when clamped, all portions of the overlapping flaps are firmly pressed together. Thus the guides O as stated press the overlapping flaps toward each other prior to and up to the time that the platens begin their operation of pressing the overlapping faces together. After engaging one box in the manner described, the frame C is slightly rotated to bring another standard into convenient position, and the same operation is repeated. This is continued until the box first sealed is returned to its initial position, and the time which has elapsed between the original sealing and the return of the package is sufficient for the complete setting of the glue or adhesive. Thus the operator, after unclamping the lever L, may return the standard E into inclined position, remove the finished box and replace another blank upon the head G.

To adapt my machine for different sizes of box or package, the heads G are removable, as has been described, and a different set of heads may be used for each size of box. The heads H do not, however, require replacement, as the guides O may be adjusted to suit the different sizes.

In the claims I use the words "lever and cam mechanism" to include their equivalents such as toggle levers.

What I claim as my invention is:

1. The combination with a revoluble carrier of a series of clamping heads mounted thereon, a series of coöperating heads also mounted on said carrier, each being movable into and out of registration with its corresponding clamping head, guides for registering said heads with each other, and independent clamping means for the respective pairs of clamping heads.

2. The combination with a revoluble standard of a series of box holders mounted thereon, each provided with a head insertible within the box, against which the end flaps may be folded, adjustable supports secured to each standard for supporting the box, a series of clamping heads corresponding to said box-holders mounted on said carrier, means permitting the adjustment of each box-holder into registration with its clamping head, and independent actuating means for the respective clamping heads.

3. The combination with a revoluble carrier of a series of standards mounted thereon and adjustable from an inclined to a vertical position, a head mounted on each standard over which the box to be sealed may be sleeved in the inclined position of the standard, means for supporting the box upon the standard in position for the turning of its end flaps against said head, a series of clamping heads secured to said carrier and respectively in registration with said standards when in upright position, and clamping levers for depressing said clamping heads against the heads of said standards.

4. The combination with a revoluble carrier of upper and lower annular frames upon said carrier, a series of standards having hinged connection with said lower frame, permitting of adjustment from a vertical to an inclined position, a form on each standard insertible into a box to be sealed and forming a head against which the end flaps of said box may be folded, a support on said standard for holding the box in position for the folding of its flaps, clamping heads vertically, adjustably mounted on said upper annular frame in position for registration with said lower heads when the supporting standards thereof are in vertical position, and clamping levers for actuating said clamping heads.

5. The combination with a revoluble carrier of a series of clamping heads mounted thereon, a series of form supports mounted on said carrier and adjustable from vertical to inclined position, exchangeable forms mounted upon said form supports, adjustable guides upon said clamping heads for registering said forms therewith, levers for depressing said clamping heads against said forms, and resilient means for raising said heads when released by said levers.

6. The combination with a revolving carrier, comprising upper and lower frames, of a series of heads pivotally supported on the lower frame, of a series of clamping heads adjustably supported on the upper frame, said heads adapted to be brought into registration, and independent actuating cam levers carried by the upper frame for the respective clamping heads.

7. The combination with a revolving carrier, comprising upper and lower frames, a series of heads pivotally supported on the lower frame, guide members carried by the upper frame, a series of clamping heads provided with brackets, said brackets arranged to slide upon the guide members, said heads adapted to be brought into registration with each other, and coöperating means carried by the guide members and the brackets for clamping the heads together.

8. The combination with a revolving carrier, comprising upper and lower frames, a series of heads pivotally supported on the lower frame, guide members carried by the upper frame, a series of clamping heads provided with brackets, said brackets arranged to slide upon the guide members, said heads adapted to be brought into registration with each other, and cam levers carried by the guide members and rollers carried by the brackets constituting means for clamping the heads together.

9. In a device of the character described the combination with a pair of platens, means for bringing said platens into and out of parallel alined relation, a lever and cam mechanism for moving one of said platens relatively to the other when in their alined condition, a stem upon which one of said platens is mounted, said last aforesaid platen consisting of a rigid plate-like structure and having edges parallel substantially to the sides of a box structure so that the loose box end extremities may be folded upon said platen into their overlapping positions, and a support upon said stem adapted to hold the lower extending unfolded extremities of said box.

10. In a device of the character described the combination with a pair of platens, means for bringing said platens into and out of parallel alined relation, a lever and cam mechanism for moving one of said platens relatively to the other when in their alined condition, a stem upon which one of said platens is mounted, said last aforesaid platen consisting of a rigid plate-like structure and having edges parallel substantially to the sides of a box structure so that the loose box end extremities may be folded upon said platen into their overlapping positions, a support upon said stem adapted to hold the lower extending unfolded extremities of said box, and a yielding mounting for one of said platens.

11. In a device of the character described the combination with a pair of platens, means for bringing said platens into and out of parallel alined relation, an adjustable stop to control said means, means for moving one of said platens relatively to the other when in their alined condition, and a stem upon which one of said platens is mounted, said last aforesaid platen consisting of a rigid plate-like structure and having edges parallel substantially to the sides of a box structure so that the loose box end extremities may be folded upon said platen into their overlapping positions, and a yielding mounting for one of said platens.

12. In a box end sealing machine the combination with a pair of relatively movable platens, a supporting structure therefor whereby relative motion may be imparted to the platens so that a box structure may be placed upon one of said platens without interference from the other platen, means for moving and locking one of said platens whereby said platens are adapted to seal the overlapping ends of a box structure placed therebetween by pressing the overlapping ends between them, and means whereby opposing box flaps may be pressed toward each other prior to sealing.

13. In a device of the character described the combination with a pair of platens, means for bringing said platens into and out of parallel alined relation, means for moving one of said platens relatively to the other when in their alined condition, a stem upon which one of said platens is mounted, and a support upon said stem adapted to hold the lower extending unfolded extremities of a box, said support forming an abutment substantially rectangularly arranged to said box extremities to counteract the thrust of said extremities occasioned by folding the extremities at the other box end.

In testimony whereof I affix my signature in presence of two witnesses.

LAWRENCE D. MORTON.

Witnesses:
R. W. WHITNEY,
E. F. ROBERTS.